US012498748B2

(12) United States Patent
Takobe

(10) Patent No.: US 12,498,748 B2
(45) Date of Patent: Dec. 16, 2025

(54) LINEAR POWER SUPPLY CIRCUIT

(71) Applicant: ROHM CO., LTD., Kyoto (JP)

(72) Inventor: Isao Takobe, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 207 days.

(21) Appl. No.: 18/452,005

(22) Filed: Aug. 18, 2023

(65) Prior Publication Data

US 2023/0393600 A1 Dec. 7, 2023

Related U.S. Application Data

(63) Continuation of application No. PCT/JP2022/006584, filed on Feb. 18, 2022.

(30) Foreign Application Priority Data

Mar. 4, 2021 (JP) ................................ 2021-034178

(51) Int. Cl.
*G05F 1/575* (2006.01)
*G05F 1/563* (2006.01)
*G05F 3/26* (2006.01)

(52) U.S. Cl.
CPC .............. *G05F 1/575* (2013.01); *G05F 1/563* (2013.01); *G05F 3/262* (2013.01)

(58) Field of Classification Search
CPC ................................ G05F 1/575; G05F 1/563
See application file for complete search history.

(56) References Cited

U.S. PATENT DOCUMENTS

2008/0284394 A1* 11/2008 Yin ......................... G05F 1/575 327/537
2012/0038332 A1* 2/2012 Lin ......................... G05F 1/575 323/277
2016/0048148 A1* 2/2016 Lee ......................... G05F 1/575 323/280
2017/0090494 A1* 3/2017 Cui ......................... G05F 1/562
2017/0192444 A1* 7/2017 Usuda ..................... G05F 1/569
2018/0136679 A1* 5/2018 Ide ............................ G05F 5/00
2019/0278314 A1* 9/2019 Hashiguchi ........... B60R 16/033
2020/0244160 A1* 7/2020 Mitev ..................... G05F 1/565

FOREIGN PATENT DOCUMENTS

JP 2020-071681 5/2020

OTHER PUBLICATIONS

International Search Report and Written Opinion in International Appln. No. PCT/JP2022/006584, mailed on May 10, 2022, 10 pages (with Machine Translation).

* cited by examiner

*Primary Examiner* — Sisay G Tiku
(74) *Attorney, Agent, or Firm* — Fish & Richardson P.C.

(57) ABSTRACT

A linear power supply circuit includes: an output stage provided between an input terminal to which an input voltage is applied and an output terminal to which an output voltage is applied and including a first output transistor and a second output transistor connected in parallel with each other; a driver configured to drive the first and second output transistors based on the difference between a voltage based on the output voltage and a reference voltage; and a potential difference suppressor configured to suppress a potential difference between the control terminal of the first output transistor and the control terminal of the second output transistor.

13 Claims, 8 Drawing Sheets

LINEAR POWER SUPPLY CIRCUIT

CROSS-REFERENCE TO RELATED APPLICATIONS

This nonprovisional application is a continuation application of International Patent Application No. PCT/JP2022/006584 filed on Feb. 18, 2022, which claims priority Japanese Patent Application No. 2021-034178 filed in Japan on Mar. 4, 2021, the entire contents of which are hereby incorporated by reference.

BACKGROUND OF THE INVENTION

1. Technical Field

The invention disclosed herein relates to linear power supply circuits.

2. Description of Related Art

Linear power supply circuits such as those of an LDO (low-dropout) type are used as power supplies in a variety of devices.

With linear power supply circuits, it is preferable that, even with a reduced capacitance value in the output capacitor, phase compensation be possible without a great increase in the circuit area.

An example of known technology relevant to what has been mentioned above is seen in JP-A-2020-071681.

The known linear power supply circuit includes an input terminal T1, an output terminal T2, a first output transistor 1, a driver 2, a reference voltage generator 3, and a phase compensation circuit 8. It also has an output capacitor 6 and a load 7 externally connected to it. The linear power supply circuit bucks (steps-down) an input voltage VIN to generate an output voltage VOUT and supplies the output voltage VOUT to the load 7. The conductivity of the first output transistor 1, and also that of a second output transistor 81, which will be described later, (put otherwise, their on-resistance values) are controlled with a gate signal G1. In the configuration shown in FIG. 10, the first and second output transistors 1 and 81 are implemented with PMOSFETs (P-channel MOSFETs). Accordingly, as the voltage level of the gate signal G1 decreases, the conductivities of the first and second output transistors 1 and 81 increase and the output voltage VOUT rises.

The driver 2 includes a differential amplifier 21, a capacitance 22, a PMOSFET 23, a current amplifier 24, and a PMOSFET 25 provided in a current mirror circuit.

One terminal of the capacitance 22 is fed with the output of the differential amplifier 21, and the other terminal of the capacitance 22 is fed with a ground potential. Thus the connection node between the differential amplifier 21 and the capacitance 22 is earth-grounded in a high-frequency band, and this helps achieve fast response of the driver 2.

The phase compensation circuit 8 includes a second output transistor 81, a resistor 82, and a capacitor 83.

One terminal of the resistor 82 is connected to the gate of the first output transistor 1 and to the gate of the PMOSFET 25 provided in the current minor circuit, and the other terminal of the resistor 82 is connected to the gate of the second output transistor 81. The capacitor 83 is connected between the gate and the source of the second output transistor 81.

Now, a description will be given of the function of the phase compensation circuit 8 in the linear power supply circuit shown in FIG. 10 as an example of known technology. FIG. 11 is a diagram showing the gain response of the transfer function of the first output transistor 1 and the phase compensation circuit 8. A first pole frequency FP1' is the frequency of a first pole that is ascribable to a parasitic capacitance CPD. The first pole of the transfer function of the first output transistor 1 is a pole with which the output capacitor 6 is unrelated.

A current that passes through the second output transistor 81, which has a CR circuit (the resistor 82 and the capacitor 83) connected to its gate, causes the first pole frequency FP1' to shift to a lower range as compared with in a case where the phase compensation circuit 8 is not provided (thick broken line). This results in a lower gain in a range higher than the first pole frequency FP1' as compared with in a case where the first pole frequency FP1' does not shift to a lower range.

Moreover, due to the first and second output transistors 1 and 81 being connected in parallel with each other and the first output transistor 1 not being affected by the resistor 82, a second pole appears at the original position of the first pole frequency FP1' before its shifting to a lower range, the frequency at the second pole being the second pole frequency FP2'. The shift of the first pole frequency FP1' to a lower range and the resulting drop in the gain causes the zero-cross frequency FZC' to shift to a lower range.

The first and second pole frequencies FP1' and FP2' are related to the second pole frequency of the transfer function of the linear power supply circuit and the output capacitor 6 shown in FIG. 10. Thus the phase compensation circuit 8 can shift the second pole frequency of the transfer function of the linear power supply circuit and the output capacitor 6 shown in FIG. 10 to a lower range as compared with in a case where the phase compensation circuit 8 is not provided. The shift permits the phase compensation circuit 8 to reduce, in a range higher than the second pole frequency of the transfer function of the linear power supply circuit and the output capacitor 6 shown in FIG. 10, the gain of the transfer function of the linear power supply circuit and the output capacitor 6 shown in FIG. 10 as compared with in a case where the phase compensation circuit 8 is not provided. This results in the zero-cross frequency of the transfer function of the linear power supply circuit and the output capacitor 6 shown in FIG. 10 shifting to a lower range. Thus, the linear power supply circuit shown in FIG. 10 can, even with a reduced capacitance in the output capacitor 6, achieve phase compensation with the sole addition of the phase compensation circuit 8 (i.e., without a great increase in the circuit area).

DETAILED DESCRIPTION

In the present description, a constant voltage denotes a voltage that is constant under ideal conditions and may be a voltage that can vary slightly with change in temperature and the like.

In the present description, a reference voltage denotes a voltage that is constant under ideal conditions and may be a voltage that can vary slightly with change in temperature and the like.

In the present description, a constant current denotes a current that is constant under ideal conditions and may be a current that can vary slightly with change in temperature and the like.

In the present description, a MOSFET denotes a transistor of which the gate has a structure composed of at least three layers which are: a layer of a conductor or a semiconductor with a low resistance value such as polysilicon; a layer of an insulator; and a layer of a P-type, N-type, or intrinsic semiconductor. That is, a MOSFET may have any gate structure other than a three-layer structure of metal, oxide, and semiconductor.

First Embodiment

Figure 1:
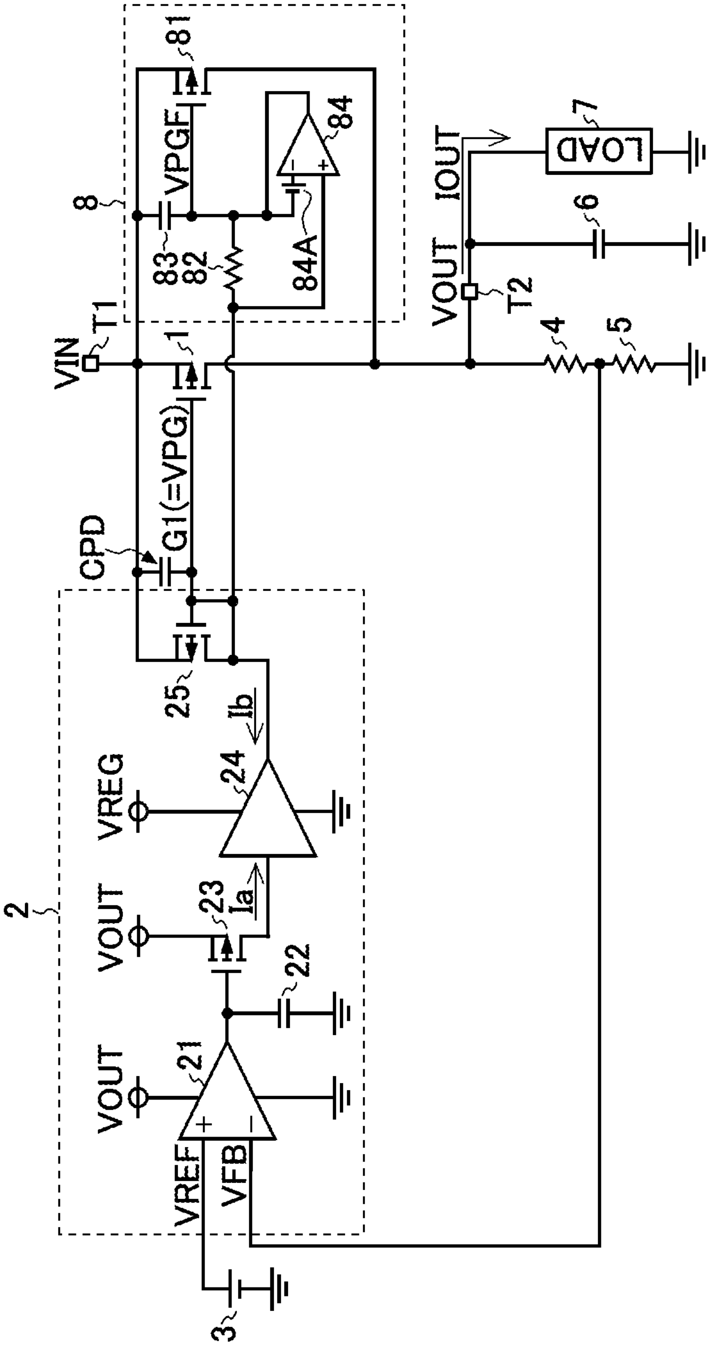
FIG. 1 is a diagram showing one configuration example of a linear power supply circuit according to a first embodiment.

FIG. 1 is a diagram showing one configuration example of a linear power supply circuit according to a first embodiment. The linear power supply circuit shown in FIG. 1 includes an input terminal T1, an output terminal T2, a first output transistor 1, a driver 2, a reference voltage generator 3, resistors 4 and 5, and a phase compensation circuit 8. The linear power supply circuit also has an output capacitor 6 and a load 7 externally connected to it.

The first output transistor 1 is provided between the input terminal T1, to which the input voltage VIN is applied, and the output terminal T2, to which the output voltage VOUT is applied.

The driver 2 drives the first output transistor 1 and a second output transistor, which will be described later. Specifically, the driver 2 feeds a gate signal G1 to the gate of the first output transistor 1 and via the resistor 82 to the gate of the second output transistor 81, thereby to drive the first and second output transistors 1 and 81. The conductivities of the first and second output transistors 1 and 81 (put otherwise, their on-resistance values) are controlled by the gate signal G1. In the configuration shown in FIG. 1, the first and second output transistors 1 and 81 are implemented with PMOSFETs. Accordingly, as the voltage level of the gate signal G1 decreases, the conductivities of the first and second output transistors 1 and 81 increase and the output voltage VOUT rises. Put the other way around, as the voltage level of the gate signal G1 increases, the conductivities of the first and second output transistors 1 and 81 decrease and the output voltage VOUT falls. The first and second output transistors 1 and 81 may be implemented with, instead of PMOSFETs, NMOSFETs or bipolar transistors.

The driver 2 includes a differential amplifier 21, a capacitance 22, a PMOSFET 23, a current amplifier 24, and a PMOSFET 25.

The inverting input terminal (−) of the differential amplifier 21 is fed with a feedback voltage VFB, and the non-inverting input terminal (+) of the differential amplifier 21 is fed with a reference voltage VREF. Based on the difference ΔV (=VFB−VREF) between the feedback voltage VFB and the reference voltage VREF, the driver 2 drives the first and second output transistors 1 and 81. As the difference ΔV increases, the driver 2 raises the voltage level of the gate signal G1; as the difference ΔV decreases, the driver 2 lowers the voltage level of the gate signal G1.

One terminal of the capacitance 22 is fed with the output of the differential amplifier 21, and the other terminal of the capacitance 22 is fed with the ground potential.

The source of the PMOSFET 23 is fed with the output voltage VOUT, and the gate of the PMOSFET 23 is fed with a voltage based on the output of the differential amplifier 21 (i.e., the voltage at the connection node between the differential amplifier 21 and the capacitance 22). The PMOSFET 23 converts the voltage based on the output of the differential amplifier 21 into a current to output this current from its drain. The connection node between the differential amplifier 21 and the capacitance 22 is earth-grounded in a high-frequency band, and this helps achieve fast response of the driver 2.

The withstand voltage of the differential amplifier 21 and the PMOSFET 23 is lower than the withstand voltage of the current amplifier 24. The gain of the differential amplifier 21 is lower than the gain of the current amplifier 24. This helps reduce the size of the differential amplifier 21 and the PMOSFET 23.

The current amplifier 24 amplifies the current Ia output from the drain of the PMOSFET 23. The supply voltage for the current amplifier 24 is a constant voltage VREG. That is, the current amplifier 24 operates from the voltage between the constant voltage VREG and the ground potential.

The PMOSFET 25 along with the first output transistor 1 constitutes a current mirror circuit. The PMOSFET 25 converts the current Ib output from the current amplifier 24 into a voltage to feed this voltage to the gate of the first output transistor 1.

The reference voltage generator 3 generates the reference voltage VREF. The resistors 4 and 5 generate the feedback voltage VFB as a division voltage of the output voltage VOUT.

The output capacitor 6 and the load 7 are supplied with the output voltage VOUT from the output terminal T2.

The phase compensation circuit 8 includes a second output transistor 81, a resistor 82, a capacitor 83, and an operational amplifier 84. Incidentally, a configuration where a delay can occur between the gate potentials of the first and second output transistors 1 and 81 permits omission of the resistor 82 and the capacitor 83 as distinct from the configuration of this embodiment.

The second output transistor 81 is connected in parallel with the first output transistor 1. That is, the source of the second output transistor 81 is connected to the source of the first output transistor 1, and the drain of the second output transistor 81 is connected to the drain of the first output transistor 1. In this embodiment, the size of the second output transistor 81 is larger than the size of output transistor 1 so that the current through the second output transistor 81 is higher than the current through the first output transistor 1. Here, "size" specifically is "area."

One terminal of the resistor 82 is connected to the gates of the first output transistor 1 and the PMOSFET 25, and the other terminal of the resistor 82 is connected to the gate of the second output transistor 81.

The capacitor 83 is provided between the gate and the source of the second output transistor 81. In this embodiment, the parasitic capacitor of the second output transistor 81 is used as the capacitor 83. Instead, a capacitor other than the parasitic capacitor of the second output transistor 81 may be used as the capacitor 83, or the parasitic capacitor of the second output transistor 81 along with a capacitor other than the parasitic capacitor of the second output transistor 81 may be used as the capacitor 83. Using a capacitor other than the parasitic capacitor of the second output transistor 81 as part of the capacitor 83 permits easy adjustment of the capacitance value of the capacitor 83. It is preferable that the capacitance value of the capacitor 83 be higher than the capacitance value of the parasitic capacitance CPD. The phase compensation circuit 8 may further include a capacitance provided between the gate and the drain of the second output transistor 81.

The operational amplifier 84 is one example of a potential difference suppressor that suppresses a potential difference between the gates of the first and second output transistors 1 and 81. The potential difference suppressor can be configured, for example, to monitor the voltage difference between the voltages at the gates of the first and second output transistors 1 and 81 and, if the voltage difference is equal to or larger than a predetermined value, output a control signal to control at least one of the voltages at the gates of the first and second output transistors 1 and 81 so as to reduce the potential difference between the gates of the first and second output transistors 1 and 81. In this embodiment, the operational amplifier 84 outputs the just-mentioned control signal.

The operational amplifier 84 has an input offset voltage 84A. The non-inverting input terminal (+) of the operational amplifier 84 is connected to the gate of the first output transistor 1. The inverting input terminal (−) and the output terminal of the operational amplifier 84 are connected to the gate of the second output transistor 81. With this configuration, if the potential difference between the gates of the first and second output transistors 1 and 81 becomes equal to or higher than the input offset voltage 84A, the operational amplifier 84 operates to keep the potential difference between the gates of the first and second output transistors 1 and 81 equal to the input offset voltage 84A.

Figure 2:
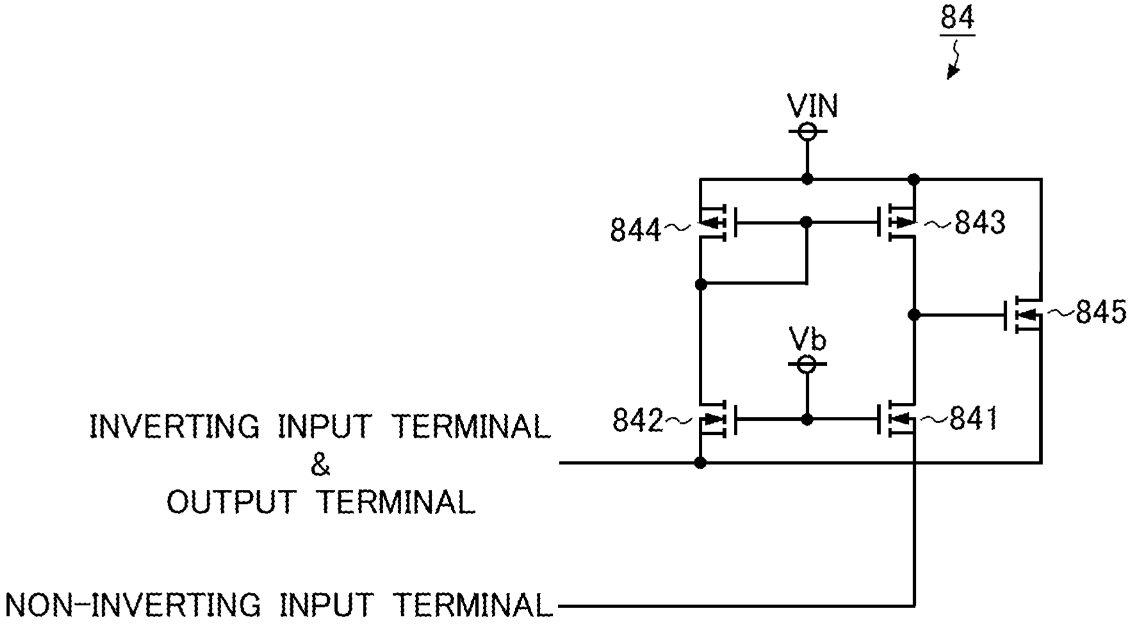
FIG. 2 is a diagram showing one configuration example of an operational amplifier.

FIG. 2 is a diagram showing one configuration example of the operational amplifier 84. The operational amplifier 84 of the configuration example shown in FIG. 2 includes an NMOSFET 841 as a first input differential pair transistor, an NMOSFET 842 as a second input differential pair transistor, PMOSFETs 843 and 844 constituting a current mirror circuit, and an NMOSFET 845 serving as a source-follower output stage.

The current minor circuit mentioned above feeds the NMOSFET 841 with a first current and feeds the NMOSFET 842 with a second current as the minor current of the first current.

The source of the NMOSFET 841 serves as the non-inverting input terminal (+) of the operational amplifier 84, the source of the NMOSFET 842 serves as the inverting input terminal (−) of the operational amplifier 84, and the source of the NMOSFET 845 serves as the output terminal of the operational amplifier 84. A bias voltage Vb is applied to the gates of the NMOSFETs 841 and 842. The drain of the NMOSFET 841 is connected to the drain of the PMOSFET 843 and to the gate of the NMOSFET 845. The drain of the NMOSFET 842 is connected to the drain and the gate of the PMOSFET 844 and to the gate of the PMOSFET 843. The input voltage VIN is fed to the source of the PMOSFET 843, to the source of the PMOSFET 844, and to the drain of the NMOSFET 845. The source of the NMOSFET 845 is connected to the source of the NMOSFET 842.

In the operational amplifier 84 of the configuration example shown in FIG. 2, the input offset voltage 84A is generated at least either by giving the NMOSFETs 841 and 842 different channel width-to-channel length ratios or by giving the first and second currents different values (setting the mirror ratio of the above-mentioned current minor circuit to other than one). With this configuration it is easy to set the input offset voltage 84A exactly to the design value.

Figure 3:
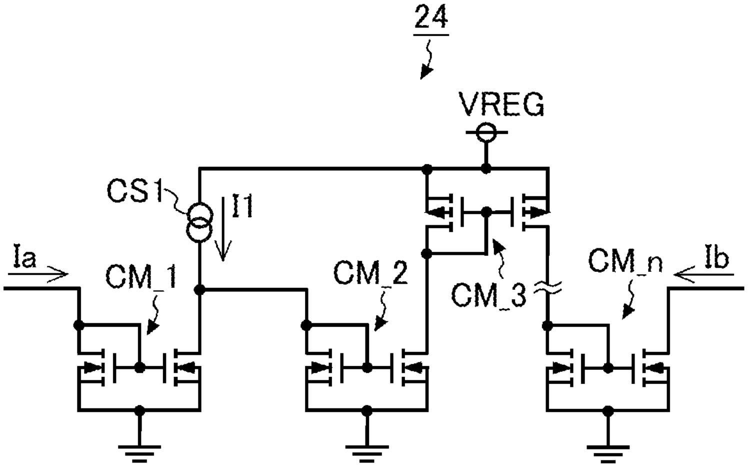
FIG. 3 is a diagram showing one configuration example of a current amplifier.

FIG. 3 is a diagram showing one configuration example of the current amplifier 24 in the linear power supply circuit shown in FIG. 1. The current amplifier 24 includes current-sink current mirror circuits CM_1, CM_2, . . . , and CM_n and current-source current mirror circuits CM_3, . . . , and CM_n−1 (though CM_n−1 is not shown in FIG. 2B). Between, at one end, the current-sink current mirror circuit CN_1 and a constant current source SC1 that produces a constant current Il and, at the other end, the current-sink current mirror circuit CM_n, from the input to the output of the current amplifier 24, there are arranged current-sink current mirror circuits and current-source current mirror circuit alternately so as to amplify a current. The amplified current eventually becomes, in the last stage, the current Ib to be converted into a voltage to serve as the gate signal G1.

Figure 4:
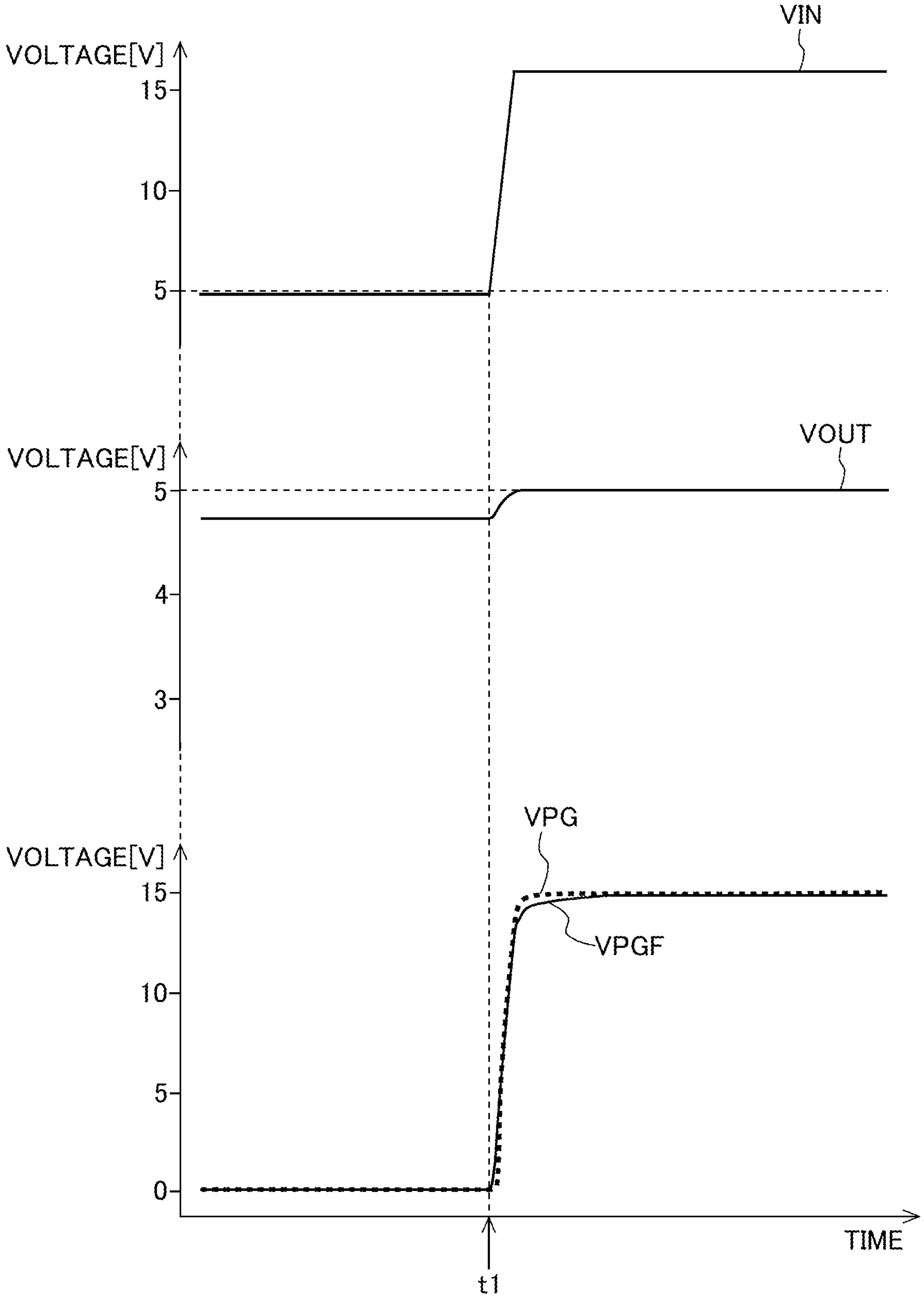
FIG. 4 is a diagram showing a relationship, in the linear power supply circuit shown in FIG. 1, among the gate voltages of a first and a second output transistor and the output voltage.

FIG. 4 is a diagram showing the relationship, in the linear power supply circuit shown in FIG. 1, among the input voltage VIN, the gate voltages of the first and second output transistors 1 and 81 respectively, and the output voltage VOUT. In FIG. 4, the vertical axis represents voltage and the horizontal axis represents time. Thus FIG. 4 shows the variation with time of each of the input voltage VIN, the output voltage VOUT, the gate voltage VPG (gate signal G1) that drives the first output transistor 1, and the gate voltage VPGF that drives the second output transistor 81.

FIG. 4 reveals the following. At time point t1, at which the input voltage VIN starts to rise from 4.75 V to 16 V, the gate voltages VPG and VPGF both start to rise and here, with no delay from the rise of the gate voltage VPG, the gate voltage VPGF rises. That is, the gate voltages VPG and VPGF rise together. This owes to the operational amplifier 84 suppressing the voltage difference between the gate voltages VPG and VPGF.

With attention paid to the conductivities of the first and second output transistors 1 and 81 respectively, the suppressed voltage difference between the gate voltages VPG and VPGF results in a suppressed difference in conductivity between those transistors. This helps suppress an overshoot in the output voltage VOUT and prevents the output voltage VOUT from exceeding the target output voltage of 5 V too far.

Second Embodiment

Figure 5:
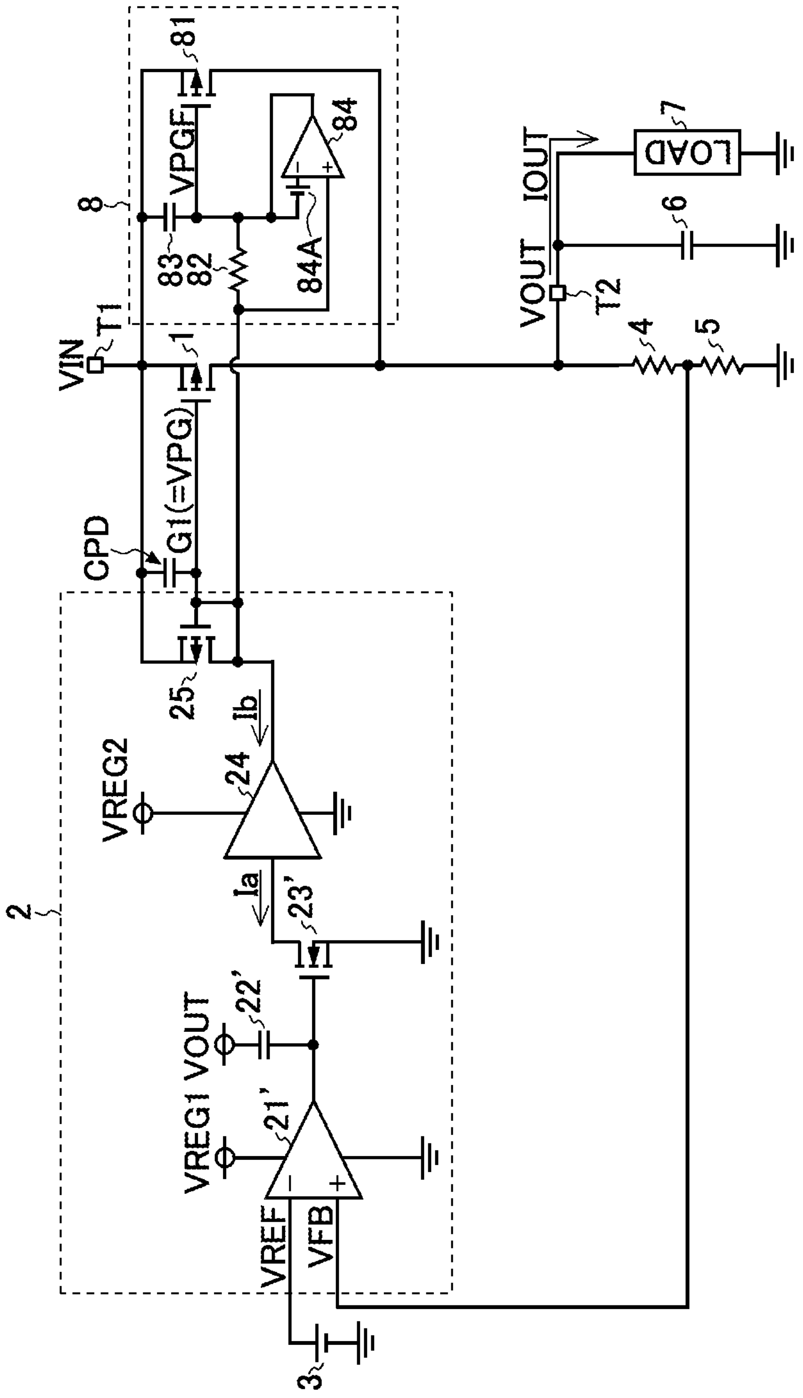
FIG. 5 is a diagram showing a configuration example of a linear power supply circuit according to a second embodiment.

FIG. 5 is a diagram showing the configuration of a linear power supply circuit according to a second embodiment. In FIG. 5, such parts as find their counterparts in FIG. 1 are identified by the same reference signs and for them no detailed description will be repeated.

In this embodiment, the driver 2 includes a differential amplifier 21', a capacitance 22', an NMOSFET 23', a current amplifier 24, and a PMOSFET 25.

The differential amplifier 21' outputs a voltage commensurate with the difference between the feedback voltage VFB and the reference voltage VREF. The supply voltage for the differential amplifier 21' is a first constant voltage VREG1. That is, the differential amplifier 21' operates from the voltage between the first constant voltage VREG1 and the ground potential.

The withstand voltage of the differential amplifier 21' and the NMOSFET 23' is lower than the withstand voltage of the current amplifier 24. The gain of the differential amplifier 21' is lower than the gain of the current amplifier 24. This helps reduce the size of the differential amplifier 21' and the NMOSFET 23'.

One terminal of the capacitance 22' is fed with the output of the differential amplifier 21', and the other terminal of the capacitance 22' is fed with the output voltage VOUT. Instead of the output voltage VOUT, a voltage that depends on the output voltage VOUT may be fed to the other terminal of the capacitance 22.

Figure 6:
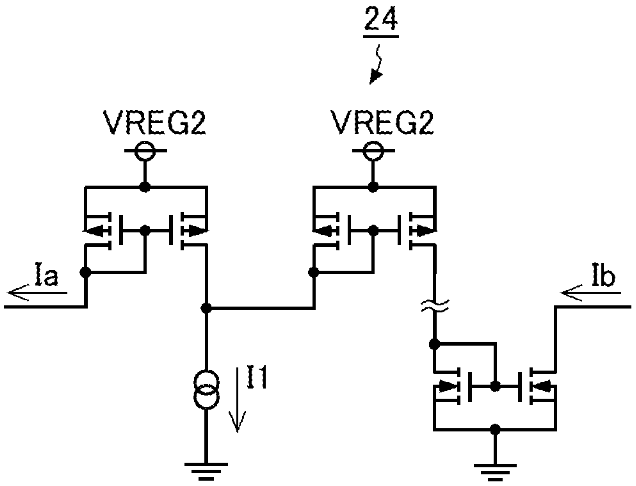
FIG. 6 is a diagram showing another configuration example of a current amplifier.

The source of the NMOSFET 23' is fed with the gate potential, and the gate of the NMOSFET 23' is fed with a voltage based on the output of the differential amplifier 21' (i.e., the voltage at the connection node between the differential amplifier 21' and the capacitance 22'). The NMOSFET 23' converts the voltage based on the output of the differential amplifier 21' into a current to output this current from its drain. The connection node between the differential amplifier 21' and the capacitance 22' serves as an output voltage VOUT-ground (positive ground) in a high-frequency band, and this helps achieve fast response of the driver 2 The current amplifier 24 amplifies the current Ia output from the drain of the NMOSFET 23'. The supply voltage for the current amplifier 24 is a second constant voltage VREG2. That is, the current amplifier 24 operates from the voltage between the second constant voltage VREG2 and the ground potential. The first and second constant voltages VREG1 and VREG2 may have an equal value, or may have different values. In this configuration example, the current Ia passes from the current amplifier 24 to the NMOSFET 23', and thus the current amplifier 24 can be implemented with, for example, a circuit configuration as shown in FIG. 6.

The phase compensation circuit in the linear power supply circuit of this embodiment shown in FIG. 5 is similar to the one in the linear power supply circuit of the first embodiment shown in FIG. 1. It thus exerts a similar effect to suppress an overshoot in the output voltage VOUT. Moreover, the linear power supply circuit of this embodiment shown in FIG. 5 can ensure the operation of the differential amplifier 21' even with a low set value for the output voltage VOUT. Incidentally, in a case where a low voltage is used as the input voltage VIN, instead of the first constant voltage VREG1 the input voltage VIN can be used as the supply voltage for the differential amplifier 21', and instead of the second constant voltage VREG2 the input voltage VIN can be used as the supply voltage for the current amplifier 24.

Third Embodiment

Figure 7:
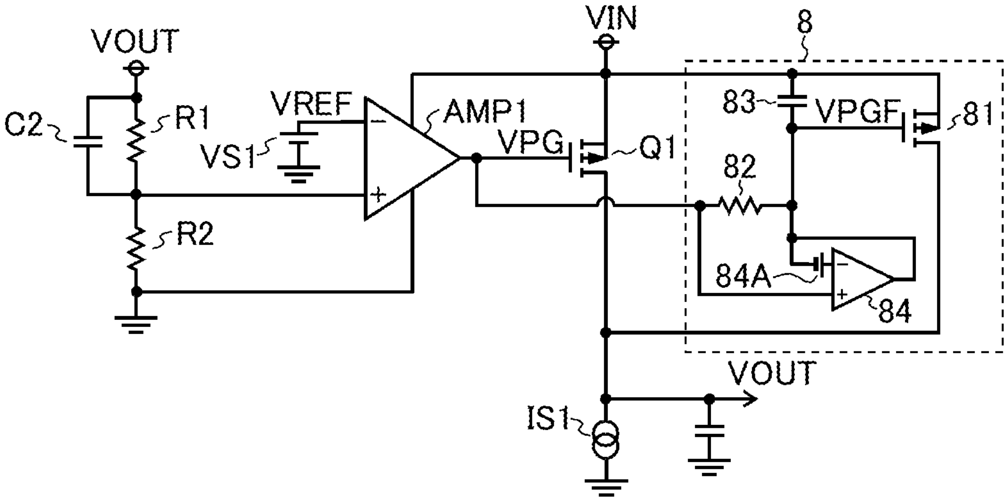
FIG. 7 is a diagram showing a configuration example of a linear power supply circuit according to a third embodiment.

FIG. 7 is a diagram showing the configuration of a linear power supply circuit according to a third embodiment. The linear power supply circuit shown in FIG. 7 results from applying the phase compensation circuit 8 to a linear power supply circuit provided with a well-known PMOS source-grounded output stage.

The linear power supply circuit provided with the PMOS source-grounded output stage shown in FIG. 7 is well known as a conventional technology, and therefore no detailed description of it will be given. Also with the linear power supply circuit shown in FIG. 7, it is possible to suppress an overshoot in the output voltage by suppressing a difference in conductivity between the first and second output transistors Q1 and 81.

As described above, a phase compensation circuit according to the invention disclosed herein can be applied not only to the linear power supply circuits according to the first and second embodiments but to configurations that include a plurality of output transistors in general.

Application Example 1

Figure 8:
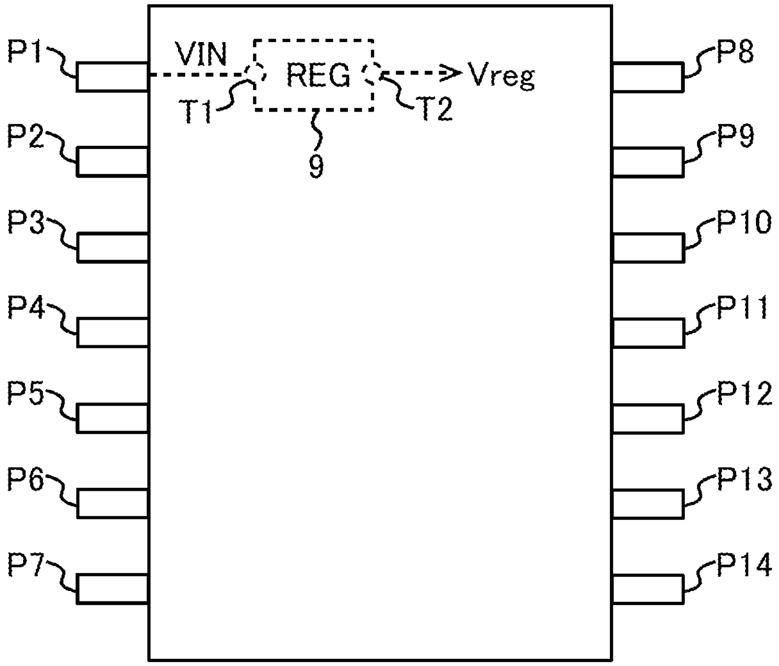
FIG. 8 is an exterior view of a semiconductor integrated circuit device.

FIG. 8 is an external view of a semiconductor integrated circuit device. The semiconductor integrated circuit device shown in FIG. 8 has external pins P1 to P14 and incorporates an internal power supply 9. The internal power supply 9 is one of the linear power supply circuits according to the first to third embodiments described previously and, in a case where it is incorporated in this way, whether an output capacitor is provided or not does not matter. The internal power supply 9 supplies an internal supply voltage Vreg (i.e., the output voltage VOUT of the linear power supply circuit) to at least some circuits in the semiconductor integrated circuit device shown in FIG. 8.

Application Example 2

Figure 9:
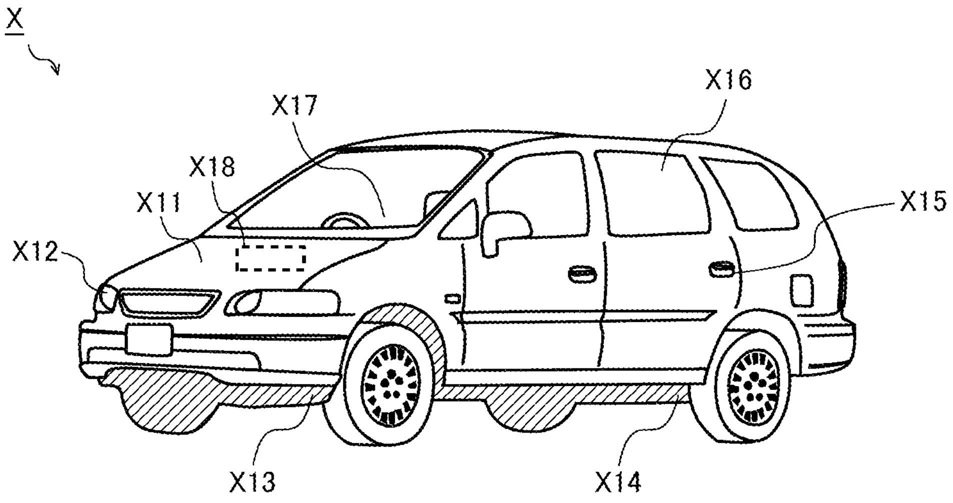
FIG. 9 is an exterior view of a vehicle.
Figure 10:
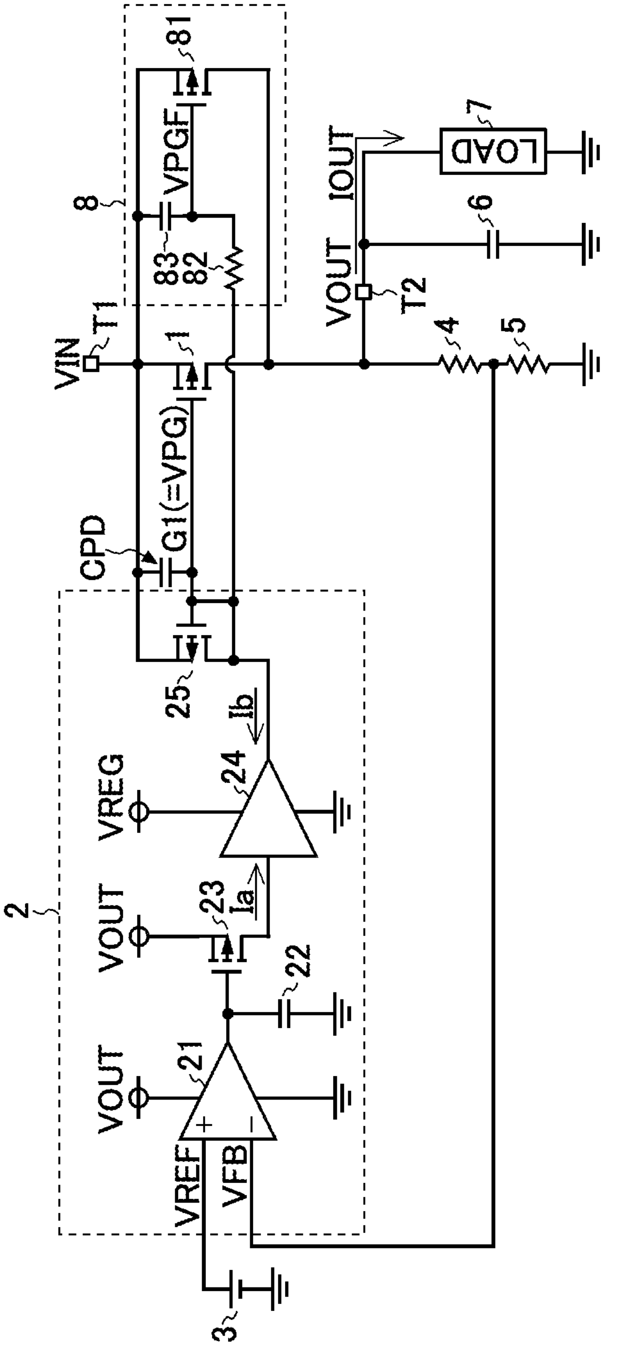
RELATED ART FIG.10
FIG. 10 is a diagram showing one configuration example of a linear power supply circuit according to JP-A-2020-071681.
Figure 11:
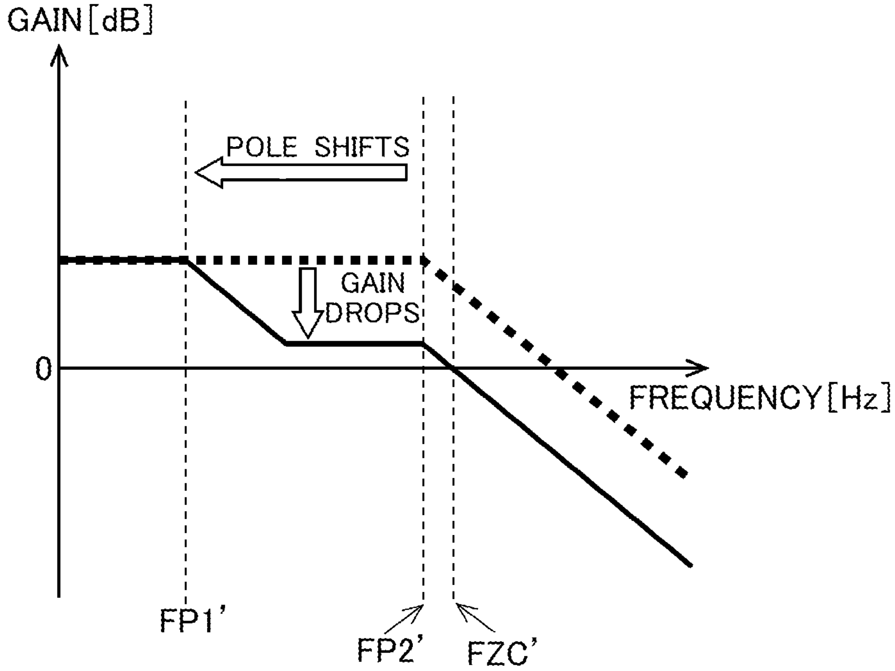
RELATED ART FIG. 11
FIG. 11 is a diagram showing the gain response of the transfer function of the linear power supply circuit and the output capacitor shown in FIG. 10.

FIG. 9 is an external view of a vehicle X. The vehicle X1 of this configuration example incorporates various electronic devices X11 to X18 that operate by being supplied with a voltage output from an unillustrated battery. For the sake of convenience, in the diagram, the electronic devices X11 to X18 may be shown at places different from where they are actually arranged.

The electronic device X11 is an engine control unit that performs control with respect to an engine (injection control, electronic throttle control, idling control, oxygen sensor heater control, automatic cruise control, etc.).

The electronic device X12 is a lamp control unit that controls the lighting and extinguishing of HIDs (high-intensity discharged lamps), DRLs (daytime running lamps), or the like.

The electronic device X13 is a transmission control unit that performs control with respect to a transmission.

The electronic device X14 is a movement control unit that performs control with respect to the movement of the vehicle X1 (ABS [anti-lock brake system] control, EPS [electric power steering] control, electronic suspension control, and the like).

The electronic device X15 is a security control unit that drives and controls door locks, burglar alarms, and the like.

The electronic device X16 comprises electronic devices incorporated in the vehicle X1 as standard or manufacturer-fitted equipment at the stage of factory shipment, such as wipers, power side mirrors, power windows, dampers (shock absorbers), a power sun roof, and power seats.

The electronic device X17 comprises electronic devices fitted to the vehicle X1 optionally as user-fitted equipment, such as A/V (audio/visual) equipment, a car navigation system, and an ETC (electronic toll control system).

The electronic device X18 comprises electronic devices provided with high-withstand-voltage motors, such as a vehicle-mounted blower, an oil pump, a water pump, and a battery cooling fan.

Any of the linear power supply circuits described previously can be built into any of the electronic devices X11 to X18.

<Notes>

The embodiments described above are to be taken in every aspect illustrative and not restrictive, and the technical scope of the invention disclosed herein is defined not by the description of the embodiments given above but by the appended claims and is to be understood to encompass any modifications made within a scope equivalent in significance to what is claimed.

The phase compensation circuit may be any circuit that can suppress a delay between the driving signals for transistors connected in parallel with each other, and its circuit configuration is not limited to that of the phase compensation circuit 8, which is described merely as an example.

According to one aspect of what is disclosed herein, a linear power supply circuit includes: an output stage between an input terminal (T1) to which an input voltage is applied and an output terminal (T2) to which an output voltage is applied, the output stage including a first output transistor (1) and a second output transistor (81) connected in parallel with each other; a driver (2) configured to drive the first and second output transistors based on the difference between a voltage based on the output voltage and a reference voltage; and a potential difference suppressor (84) configured to suppress a potential difference between the control terminal of the first output transistor and the control terminal of the second output transistor. (A first configuration.)

The linear power supply circuit of the first configuration described above suppresses a potential difference between the control terminals of the first and second output transistors. It is thus possible to suppress an overshoot in the output voltage caused by a delay ascribable to a resistor and a capacitor for phase compensation.

In the linear power supply circuit of the first configuration described above, the potential difference suppressor may be configured to monitor the voltage difference between the voltage at the control terminal of the first output transistor and the voltage at the control terminal of the second output transistor and, if the voltage difference is equal to or larger than a predetermined value, output a control signal to control at least one of the voltages at the control terminals of the first and second output transistors so as to reduce the potential difference between the control terminals of the first and second output transistors. (A second configuration.)

The linear power supply circuit of the second configuration described above prevents the potential difference between the control terminals of the first and second output transistors from becoming equal to or larger than a predetermined value. It is thus possible to reliably suppress an overshoot in the output voltage caused by a delay ascribable to a resistor and a capacitor for phase compensation.

In the linear power supply circuit of the second configuration described above, the potential difference suppressor may include an operational amplifier, and the operational amplifier may output the control signal. (A third configuration.)

With the linear power supply circuit of the third configuration described above, it is possible to build the potential difference suppressor with a simple configuration.

In the linear power supply circuit of the third configuration described above, the operational amplifier may have an input offset voltage. The non-inverting input terminal of the operational amplifier may be connected to the control terminal of the first output transistor, and the inverting input terminal and the output terminal of the operational amplifier may be connected to the control terminal of the second output transistor. (A fourth configuration.)

With the linear power supply circuit of the fourth configuration described above, it is possible, with the input offset voltage, to easily prevent the potential difference between the control terminals of the first and second output transistors from becoming equal to or larger than a predetermined value.

In the linear power supply circuit of the fourth configuration described above, the operational amplifier may include: a first input differential pair transistor connected to the control terminal of the first output transistor; a second input differential pair transistor connected to the control terminal of the second output transistor; and a current mirror circuit configured to feed the first input differential pair transistor with a first current and feed the second input differential pair transistor with a second current as a mirror current of the first current. The input offset voltage may be generated at least either by using MOS transistors as the first and second input differential pair transistors and giving the MOS transistors different channel width-to-channel length ratios, or by giving the first and second currents different values. (A fifth configuration.)

With the linear power supply circuit of the fifth configuration described above, it is easy to set the input offset voltage exactly to the design value.

The linear power supply circuit of any of the first to fifth configurations described above may further include: a resistor (82) between the control terminals of the first and second output transistors; and a capacitor (83) of which one terminal is connected to the input terminal and of which the other terminal is connected to the connection node between the resistor and the control terminal of the second output transistor. (A sixth configuration.)

With the linear power supply circuit of the sixth configuration described above, it is possible to achieve phase compensation without a great increase in the circuit area.

In the linear power supply circuit of the sixth configuration described above, the capacitor may be a parasitic capacitor of the second output transistor. (A seventh configuration.)

With the linear power supply circuit of the seventh configuration described above, it is possible to more effectively suppress an increase in the circuit area.

In the linear power supply circuit of the sixth or seventh configuration described above, the capacitance value of the capacitor is higher than the capacitance value of a capacitance (CPD) between the first terminal, connected to the input terminal, of the output transistor and the control terminal of the first output transistor. (An eighth configuration.)

With the linear power supply circuit of the eighth configuration described above, it is easy to achieve phase compensation.

In the linear power supply circuit of any of the sixth to eighth configurations described above, the capacitor may include a capacitance different between a parasitic capacitance present between the first terminal, connected to the input terminal, of the second output transistor and the control terminal of the second output transistor. (A ninth configuration.)

With the linear power supply circuit of the ninth configuration described above, it is easy to adjust the capacitance value of the capacitor.

In the linear power supply circuit of any of the first to ninth configurations described above, the first and second output transistors may have different sizes. (A tenth configuration.)

With the linear power supply circuit of the tenth configuration described above, it is possible to make the currents through the first and second output transistors different in magnitude.

In the linear power supply circuit of the tenth configuration described above, the size of the second output transistor may be larger than the size of the first output transistor. (An eleventh configuration.)

With the linear power supply circuit of the eleventh configuration described above, it is possible to make the current through the second output transistor higher than the current through the first output transistor.

In the linear power supply circuit of any of the first to eleventh configurations described above, the output stage may be configured as a PMOS source-grounded circuit. (A twelfth configuration.)

With the linear power supply circuit of the twelfth configuration described above, it is possible to obtain a high voltage gain in the output stage.

According to another aspect of what is disclosed herein, a vehicle includes a linear power supply circuit of any of the first to twelfth configurations described above. (A thirteenth configuration.)

With the vehicle of the thirteenth configuration described above, it is possible to suppress an overshoot in the output voltage of the linear power supply circuit.

The invention claimed is:

1. A linear power supply circuit, comprising:

an output stage between an input terminal to which an input voltage is applied and an output terminal to which an output voltage is applied, the output stage including a first output transistor and a second output transistor connected in parallel with each other;

a driver configured to drive the first and second output transistors based on a difference between a voltage, which is based on the output voltage, and a reference voltage; and a potential difference suppressor configured to suppress a potential difference between a control terminal of the first output transistor and a control terminal of the second output transistor, wherein the potential difference suppressor is configured to monitor a voltage difference between a first voltage at the control terminal of the first output transistor and a second voltage at the control terminal of the second output transistor and, based on the voltage difference being equal to or larger than a predetermined value, output a control signal to control the first voltage and/or the second voltage at the control terminals of the first and second output transistors so as to reduce the potential difference between the control terminals of the first and second output transistors, the potential difference suppressor includes an operational amplifier, the operational amplifier is configured to output the control signal, the operational amplifier is configured to receive an input offset voltage, a non-inverting input terminal of the operational amplifier is connected to the control terminal of the first output transistor, an inverting input terminal and an output terminal of the operational amplifier are connected to the control terminal of the second output transistor, and wherein the operational amplifier includes a first input differential pair transistor connected to the control terminal of the first output transistor, a second input differential pair transistor connected to the control terminal of the second output transistor, and a current mirror circuit configured to feed the first input differential pair transistor with a first current and feed the second input differential pair transistor with a second current as a mirror current of the first current, and the input offset voltage is generated at least either by using MOS transistors as the first and second input differential pair transistors, wherein the MOS transistors have different channel width-to-channel length ratios, or by giving the first and second currents different values.

2. The linear power supply circuit according to claim 1, wherein the first and second output transistors have different sizes.

3. The linear power supply circuit according to claim 2, wherein the size of the second output transistor is larger than the size of the first output transistor.

4. The linear power supply circuit according to claim 1, wherein the output stage is configured as a PMOS source-grounded circuit.

5. A vehicle, comprising the linear power supply circuit according to claim 1.

6. A linear power supply circuit, comprising:

an output stage between an input terminal, which is arranged to receive an input voltage, and an output terminal, which is arranged to provide an output voltage, the output stage including a first output transistor and a second output transistor connected in parallel with each other;

a driver configured to drive the first and second output transistors based on a difference between a voltage, which is based on the output voltage, and a reference voltage;

a potential difference suppressor configured to suppress a potential difference between a control terminal of the first output transistor and a control terminal of the second output transistor;

a resistor between the control terminals of the first and second output transistors; and a capacitor of which one terminal is connected to the input terminal and of which another terminal is connected to a connection node between the resistor and the control terminal of the second output transistor.

7. The linear power supply circuit according to claim 6, wherein the capacitor is a parasitic capacitor of the second output transistor.

8. The linear power supply circuit according to claim 6, wherein a capacitance value of the capacitor is higher than a capacitance value of a capacitance between a first terminal, connected to the input terminal, of the output transistor and the control terminal of the first output transistor.

9. The linear power supply circuit according to claim 6, wherein the capacitor includes a capacitance different between a parasitic capacitance present between the first terminal, connected to the input terminal, of the second output transistor and the control terminal of the second output transistor.

10. The linear power supply circuit according to claim 6, wherein the first and second output transistors have different sizes.

11. The linear power supply circuit according to claim 10, wherein the size of the second output transistor is larger than the size of the first output transistor.

12. The linear power supply circuit according to claim 6, wherein the output stage is configured as a PMOS source-grounded circuit.

13. A vehicle, comprising the linear power supply circuit according to claim 6.

* * * * *